US009556351B2

(12) United States Patent
Weingart et al.

(10) Patent No.: US 9,556,351 B2
(45) Date of Patent: Jan. 31, 2017

(54) RUBBER COMPOSITION SUITABLE FOR USE AS A CAP PLY IN A TIRE

(71) Applicant: BRIDGESTONE AMERICAS TIRE OPERATIONS, LLC, Nashville, TN (US)

(72) Inventors: Natalie Weingart, Canton, OH (US); David R. Stewart, Kent, OH (US); Jamie J. McNutt, Tallmadge, OH (US); Tomohiro Kusano, Tokyo (JP)

(73) Assignee: Bridgestone Americas Tire Operations, Inc., Nashville, TN (US)

(*) Notice: Subject to any disclaimer, the term of this patent is extended or adjusted under 35 U.S.C. 154(b) by 0 days.

(21) Appl. No.: 14/886,915

(22) Filed: Oct. 19, 2015

(65) Prior Publication Data

US 2016/0040024 A1 Feb. 11, 2016

Related U.S. Application Data

(63) Continuation of application No. 13/980,755, filed as application No. PCT/US2012/021712 on Jan. 18, 2012, now Pat. No. 9,163,127.

(60) Provisional application No. 61/434,010, filed on Jan. 19, 2011.

(51) Int. Cl.
| | |
|---|---|
| C08K 3/22 | (2006.01) |
| C09D 107/00 | (2006.01) |
| B60C 1/00 | (2006.01) |
| C08K 5/25 | (2006.01) |
| C08K 5/3492 | (2006.01) |

(52) U.S. Cl.
CPC ............. *C09D 107/00* (2013.01); *B60C 1/00* (2013.01); *C08K 3/22* (2013.01); *C08K 5/25* (2013.01); *C08K 5/34922* (2013.01); *B60C 2001/0083* (2013.04); *C08K 2003/2296* (2013.01)

(58) Field of Classification Search
CPC .. C09D 107/00; C08K 3/22; C08K 2003/2296
USPC ........................................................ 524/432
See application file for complete search history.

(56) References Cited

U.S. PATENT DOCUMENTS

| | | |
|---|---|---|
| 4,605,696 A | 8/1986 | Benko et al. |
| 4,818,601 A | 4/1989 | Itoh et al. |
| 4,935,297 A | 6/1990 | Yotsumoto |
| 5,206,289 A | 4/1993 | Sinsky et al. |
| 5,534,569 A | 7/1996 | Etoh |
| 6,380,288 B1 | 4/2002 | Hojo et al. |
| 6,506,849 B1 | 1/2003 | Hojo et al. |
| 6,566,449 B2 | 5/2003 | Sugimoto et al. |
| 6,787,595 B1 | 9/2004 | Yamada et al. |
| 6,822,027 B2 | 11/2004 | Shiina |
| 7,378,464 B2 | 5/2008 | Aoki |
| 7,534,828 B2 | 5/2009 | D'Sidocky et al. |
| 7,566,748 B2 | 7/2009 | Sandstrom |
| 2005/0176858 A1 | 8/2005 | Nohara et al. |
| 2005/0250883 A1 | 11/2005 | Shibata et al. |
| 2006/0128841 A1 | 6/2006 | Sandstrom |
| 2006/0213597 A1 | 9/2006 | Takimura |
| 2010/0132861 A1 | 6/2010 | Sandstrom et al. |
| 2010/0168306 A1* | 7/2010 | Barbotin ................... B60C 1/00 524/327 |
| 2012/0270966 A1 | 10/2012 | Thuilliez et al. |
| 2012/0277359 A1 | 11/2012 | Thuilliez et al. |

FOREIGN PATENT DOCUMENTS

| | | |
|---|---|---|
| FR | 2940298 | 6/2010 |
| FR | 2940299 | 6/2010 |
| JP | 2000190704 A | 7/2000 |
| JP | 2001191720 A | 7/2001 |
| JP | 2002103913 A | 4/2002 |
| JP | 2004231691 | 8/2004 |
| JP | 2006076407 A | 3/2006 |
| JP | 2006143830 A | 6/2006 |
| JP | 2004189772 A | 7/2007 |
| JP | 2008184551 A | 8/2008 |
| JP | 2010209176 A | 9/2010 |
| WO | 2012099955 | 7/2012 |

OTHER PUBLICATIONS

Bai, Lingfei, International Preliminary Report on Patentability from PCT/US2012/021712, 6 pp. (Jul. 23, 2013).
Komori, I, Office Action with English Translation from Japanese Patent Application No. 2013-550562, 2 pp. (Apr. 8, 2014).
Komori, I, Office Action with English Translation from Japanese Patent Application No. 2013-550562, 2 pp. (Mar. 24, 2015).
Extended European Search Communication dated Jul. 29, 2014 in corresponding application EP 12736977.5.
Komori, I, Office Action with English Translation From Japanese Patent Application No. 2013-550562, 3 pp. (Sep. 30, 2014).
Barker, Stephan, European Search Report from EP12736977.5, 3 pp. (Jul. 29, 2014).
Young, Jung Doo, International Search Report with Written Opinion from PCT/US2012/021712, 11 pp. (Aug. 22, 2012).

\* cited by examiner

*Primary Examiner* — Hui Chin
(74) *Attorney, Agent, or Firm* — Shaun J. Fox; Jenny Sheaffer

(57) ABSTRACT

Disclosed is a rubber composition suitable for use as a cap ply rubber composition. The rubber composition comprises: (a) at least one natural or synthetic rubbery polymer; (b) from 0.1 to 20 phr of at least one hydrazide compound; (c) from 0.1 to 10 phr of at least one methylene donor; (d) from 0.1 to 10 phr of at least one methylene acceptor resin; and (e) from 0.1 to 10 phr of zinc oxide is disclosed. A method of making the same is also disclosed.

19 Claims, No Drawings

RUBBER COMPOSITION SUITABLE FOR USE AS A CAP PLY IN A TIRE

FIELD OF THE DISCLOSURE

This disclosure generally relates to a rubber composition suitable for use in a cap ply of tire, and a method of making the same.

BACKGROUND

Typically, tires are manufactured from a carcass having a substantially U-shaped section with metal beads at the inner perimeters of the walls. Support can be provided to a tire carcass by steel cord belt plies extending around the outer periphery of the carcass and across the width of the tread. Such steel belt plies are relatively inextensible in the intended direction of rotation of the tire and include steel belt cords disposed parallel to the direction of rotation or at a low angle thereto. The belt plies act to restrict the movement of the tread and give the tire better road-holding properties. Support such as this type is particularly important in a radial tire, where the carcass is formed from a rubberized woven fabric having relatively inextensible reinforcing cords running transversely, i.e. radially, from bead to bead.

To further improve the high speed performance, some tires have one or more cap plies laid circumferentially over the belt plies. A cap ply is a layer comprising cords (typically nylon or polyester) encapsulated in a rubber composition that is laid over all or a portion of the axial width of the steel belt plies. These cap plies are not found in all tires; they are mostly used on tires with higher speed ratings to help all the components of the tire stay in place at high speeds.

The rubber composition used in the cap ply must have good adhesion to the cords used in the cap ply, good hysteresis so that heat generation is low, and good mechanical properties (e.g., modulus and elongation).

The inventors have discovered a rubber composition suitable for use in the cap ply of a tire that possesses a good balance of the above properties.

SUMMARY

Disclosed is a cap ply rubber composition comprising at least one natural or synthetic rubbery polymer; from 0.1 to 20 phr of at least one hydrazide compound; from 0.1 to 10 phr of at least one methylene donor; from 0.1 to 10 phr of at least one methylene acceptor resin; and from 0.1 to 10 phr of zinc oxide.

Also disclosed is a method for reducing hysteresis in a tire, where said method comprises utilizing a cap ply comprising at least one cord layer coated with a skim rubber composition made by a process comprising: mixing at least one natural or synthetic rubbery polymer with; from 0.1 to 20 phr of at least one hydrazide compound; from 0.1 to 10 phr of at least one methylene donor; from 0.1 to 10 phr of at least one methylene acceptor resin; and from 0.1 to 10 phr of zinc oxide.

Further disclosed is a method for preparing a rubber composition comprising mixing at least one natural or synthetic rubbery polymer; from 0.1 to 20 phr of at least one hydrazide compound; from 0.1 to 10 phr of at least one methylene donor; from 0.1 to 10 phr of at least one methylene acceptor resin; and from 0.1 to 10 phr of zinc oxide; wherein a portion of the zinc oxide is mixed in a non-productive mixing stage and the remaining portion of zinc oxide is mixed in a productive mixing stage.

Other aspects of the present disclosure will be apparent to the ordinarily skilled artisan from the description that follows. To assist in understanding the description of various embodiments that follow, certain definitions are provided immediately below. These are intended to apply throughout unless the surrounding text explicitly indicates a contrary intention:

"cap ply" means a layer of cords encapsulated in a rubber composition that is laid circumferentially over all or a portion of the axial width of the steel belt plies;

"cap ply rubber composition" and "cap ply skim rubber composition" are used herein interchangeably, and mean the rubber composition that encapsulates the cords of the cap ply;

"polymer" means the polymerization product of one or more monomers and is inclusive of homo-, co-, ter-, tetra-polymers, etc.;

"copolymer" means a polymer that includes mer units derived from two reactants, typically monomers, and is inclusive of random, block, segmented, graft, gradient, etc., copolymers; and "phr" means parts by weight of a referenced material per 100 parts by weight rubber, and is a recognized term by those having skill in the rubber compounding art.

All references incorporated herein by reference are incorporated in their entirety unless otherwise stated.

DETAILED DESCRIPTION

A cap ply rubber composition comprising: (a) at least one natural or synthetic rubbery polymer; (b) from 0.1 to 20 phr of at least one hydrazide compound; (c) from 0.1 to 10 phr of at least one methylene donor; (d) from 0.1 to 10 phr of at least one methylene acceptor resin; and (e) from 0.1 to 10 phr of zinc oxide is disclosed.

The natural or synthetic rubbery polymer can be any polymer suitable for use in a cap ply rubber composition. Examples of rubbery polymers that may be used in the compositions described herein include, but are not limited to, natural rubber, synthetic polyisoprene rubber, styrene-butadiene rubber (SBR), styrene-isoprene rubber, styrene-isoprene-butadiene rubber, butadiene-isoprene-styrene terpolymer, butadiene-isoprene rubber, polybutadiene, butyl rubber, neoprene, acrylonitrile-butadiene rubber (NBR), silicone rubber, the fluoroelastomers, ethylene acrylic rubber, ethylene-propylene rubber, ethylene-propylene terpolymer (EPDM), ethylene vinyl acetate copolymer, epichlorohydrin rubber, chlorinated polyethylene-propylene rubbers, chlorosulfonated polyethylene rubber, hydrogenated nitrile rubber, and terafluoroethylene-propylene rubber. A mixture of rubbery polymers may be used. In one embodiment, the cap ply rubber composition may comprise a mixture of natural rubber and styrene-butadiene rubber.

The cap ply rubber composition comprises from 0.1 to 20 phr, from 0.1 to 10 phr, or alternatively 0.1 to 5 phr of at least one hydrazide compound. Examples of suitable hydrazide compounds include, but are not limited to, those according to Formulas I and II:

I

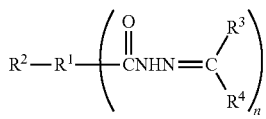

where $R^1$ is an acyclic aliphatic group having 2-18 carbons, a cyclic aliphatic group having 5-20 carbons, an aromatic group having 6-18 carbons, or an alkylaromatic group having 7-24 carbons. $R^1$ may optionally contain at least one heteroatom of O, N and S, provided that the acyclic aliphatic group contains an aromatic group therein. $R^2$ is a hydrogen atom, a hydroxy group, an amino group or a mercapto group. Each $R^3$ and $R^4$ is a hydrogen atom, an alkyl group having 1-18 carbons, a cyclohexyl group or an aromatic group, and may be the same or different and may optionally contain at least one heteroatom of O, N and S. Finally, n is an integer of 1-3.

Examples of suitable specific hydrazide compounds include, but are not limited to, 1-hydroxy-N'-(1-methylethylidene)-2-naphthoic acid hydrazide, 1-hydroxy-N'-(1-methylpropylidene)-2-naphthoic acid hydrazide, 1-hydroxy-N'-(1-methylbutylidene)-2-naphthoic acid hydrazide, 1-hydroxy-N'-(1,3-dimethylbutylidene)-2-naphthoic acid hydrazide, 1-hydroxy-N'-(2,6-dimethyl-4-heptylidene)-2-naphthoic acid hydrazide, 1-hydroxy-N'-(2-furylmethylene)-2-naphthoic acid hydrazide, 3-hydroxy-N'-(1-methylethylidene)-2-naphthoic acid hydrazide, 3-hydroxy-N'-(1-methylpropylidene)-2-naphthoic acid hydrazide, 3-hydroxy-N'-(1-methylbutylidene)-2-naphthoic acid hydrazide, 3-hydroxy-N'-(1,3-dimethylbutylidene)-2-naphthoic acid hydrazide, 2-hydroxy-N'-(2,6-dimethyl-4-heptylidene)-3-naphthoic acid hydrazide, 2-hydroxy-N'-(2-furylmethylene)-3-naphthoic acid hydrazide, isophthalic acid di(1-methylethylidene)hydrazide, isophthalic acid di(1-methylpropylidene)hydrazide, isophthalic acid di(1-methylbutylidene)hydrazide, isophthalic acid di(1,3-dimethylbutylidene)hydrazide, isophthalic acid di(2,6-dimethyl-4-heptylidene)hydrazide, isophthalic acid di(2-furylmethylene)hydrazide, isonicotinic acid (1-methylethylidene)hydrazide, isonicotinic acid (1-methylpropylidene)hydrazide, isonicotinic acid (1-methylbutylidene)hydrazide, isonicotinic acid (2,6-dimethyl-4-heptylidene)hydrazide, isonicotinic acid (1,3-dimethylbutylidene) hydrazide, isonicotinic acid (2-furylmethylene)hydrazide, N'-(1-methylethylidene)-salicylic acid hydrazide, N'-(1-methylpropylidene)-salicylic acid hydrazide, N'-(1-methylbutylidene)-salicylic acid hydrazide, N'-(1,3-dimethylbutylidene)-salicylic acid hydrazide, N'-(2,6-dimethyl-4-heptylidene)-salicylic acid hydrazide, N'-(2-furylmethylene)-salicylic acid hydrazide, N'-(1-methylethylidene)-benzoic acid hydrazide, N'-(1-methylpropylidene)-benzoic acid hydrazide, N'-(1,3-dimethylbutylidene)-benzoic acid hydrazide, N'-(benzylidene)-benzoic acid hydrazide, N'-(4-dimethylaminophenylmethylene)-benzoic acid hydrazide, N'-(4-methoxyphenylmethylene)-benzoic acid hydrazide, N'-(4-hydroxyphenyl methylene)-benzoic acid hydrazide, N'-(1-phenylethylidene)-benzoic acid hydrazide, N'-(diphenylmethylene)-benzoic acid hydrazide, N'-[1-(2,4-dihydroxyphenyl)benzylidene]-benzoic acid hydrazide, N'-(2-furylmethylene)-benzoic acid hydrazide, N'-(1-methylethylidene)-1-naphthoic acid hydrazide, N'-(1-methylpropylidene)-1-naphthoic acid hydrazide, N'-(1,3-dimethylbutylidene)-1-naphthoic acid hydrazide, N'-(benzylidene)-1-naphthoic acid hydrazide, N'-(4-dimethylaminophenylmethylene)-1-naphthoic acid hydrazide, N'-(4-methoxyphenylmethylene)-1-naphthoic acid hydrazide, N'-(4-hydroxyphenyl methylene)-1-naphthoic acid hydrazide, N'-(1-phenylethylidene)-1-naphthoic acid hydrazide, N'-(diphenylmethylene)-1-naphthoic acid hydrazide, N'-(1-(2,4-dihydroxyphenyl)benzylidene)-1-naphthoic acid hydrazide, N'-(2-furylmethylene)-1-naphthoic acid hydrazide, N'-(1-methylethylidene)-2-naphthoic acid hydrazide, N'-(1-methylpropylidene)-2-naphthoic acid hydrazide, N'-(1,3-dimethylbutylidene)-2-naphthoic acid hydrazide, N'-(benzylidene)-2-naphthoic acid hydrazide, N'-(4-dimethylaminophenylmethylene)-2-naphthoic acid hydrazide, N'-(4-methoxyphenylmethylene)-2-naphthoic acid hydrazide, N'-(4-hydroxyphenylmethylene)-2-naphthoic acid hydrazide, N'-(1-phenylethylidene)-2-naphthoic acid hydrazide, N'-(diphenylmethylene)-2-naphthoic acid hydrazide, N'-[1-(2,4-dihydroxyphenyl)benzylidene]-2-naphthoic acid hydrazide, N'-(2-furylmethylene)-2-naphthoic acid hydrazide, N'-(1-methylethylidene)-propionic acid hydrazide, N'-(1-methylpropylidene)propionic acid hydrazide, N'-(1,3-dimethylbutylidene)-propionic acid hydrazide, N'-(benzylidene)propionic acid hydrazide, N'-(4-dimethylaminophenylmethylene)-propionic acid hydrazide, N'-(4-methoxyphenylmethylene)propionic acid hydrazide, N'-(4-hydroxyphenyl methylene)-propionic acid hydrazide, N'-(1-phenylethylidene)-propionic acid hydrazide, N'-(diphenylmethylene)-propionic acid hydrazide, N'-[1-(2,4-dihydroxyphenyl)benzylidene]-propionic acid hydrazide, N'-(2-furylmethylene)-propionic acid hydrazide, N'-(1-methylethylidene)-2-methyl-propionic acid hydrazide, N'-(1-methylpropylidene)-2-methyl-propionic acid hydrazide, N'-(1,3-dimethylbutylidene)-2-methyl-propionic acid hydrazide, N'-(benzylidene), 2-methyl-propionic acid hydrazide, N'-(4-dimethylaminophenylmethylene), 2-methyl-propionic acid hydrazide, N'-(4-methoxyphenylmethylene), 2-methyl-propionic acid hydrazide, N'-(4-hydroxyphenylmethylene), 2-methyl-propionic acid hydrazide, N'-(1-phenylethylidene), 2-methyl-propionic acid hydrazide, N'-(diphenylmethylene), 2-methyl-propionic acid hydrazide, N'-[1-(2,4-dihydroxy phenyl)benzylidene], 2-methyl-propionic acid hydrazide, N'-(2-furylmethylene), 2-methyl-propionic acid hydrazide, N'-(1-methylethylidene), 2,2-dimethyl-propionic acid hydrazide, N'-(1-methylpropylidene), 2,2-dimethyl-propionic acid hydrazide, N'-(1,3-dimethylbutylidene), 2,2-dimethyl propionic acid hydrazide, N'-(benzylidene), 2,2-dimethyl-propionic acid hydrazide, N'-(4-dimethylamino phenylmethylene), 2,2-dimethyl-propionic acid hydrazide, N'-(4-methoxyphenyl methylene), 2,2-dimethyl-propionic acid hydrazide, N'-(4-hydroxyphenyl methylene), 2,2-dimethyl-propionic acid hydrazide, N'-(1-phenylethylidene), 2,2-dimethyl-propionic acid hydrazide, N'-(diphenylmethylene), 2,2-dimethyl-propionic acid hydrazide, N'-[1-(2,4-dihydroxyphenyl)benzylidene], 2,2-dimethyl propionic acid hydrazide, N'-(2-furylmethylene), 2,2-dimethyl-propionic acid hydrazide and so on. One or more hydrazide compounds can be included in the rubber composition. Among other suitable hydrazide compounds are substituted hydrazide compounds, such as those disclosed in U.S. Pat. No. 6,380,288, which is incorporated herein by reference in its entirety.

The cap ply rubber composition also comprises from 0.1 to 10 phr, from 0.1 to 8 phr, or alternatively from 0.1 to 5 phr of a methylene acceptor resin. The term "methylene acceptor" is known to those having skill in such art and is used to describe the reactant(s), or compound(s) with which the methylene donor compound, described below, reacts to form what is believed to be an intermediate methylol monomer. It is envisioned that a condensation of the intermediate methylol monomer by formation of a methylene bridge produces a resin material. The initial reactant for which it is envisioned contributes the moiety that later forms the methylene bridge and ultimately the resin is referred to as being the methylene donor compound and the other reactant is referred to as being the methylene acceptor compound. Examples of methylene acceptors are indicated herein and include, for example, but are not limited to those disclosed in U.S. Pat. Nos. 6,605,670, 6,472,457, 5,945,500, 5,936,056, 5,688,871, 5,665,799, 5,504,127, 5,405,897, 5,244,725, 5,206,389, 5,194,513, 5,030,692, 4,889,481, 4,605,696, 4,436,853 and 4,092,455, each of which is incorporated herein by reference in its entirety. Generically, examples of suitable methylene acceptor compounds include, but are not limited to, resorcinol, resorcinolic derivatives, monohydric phenols and derivatives thereof, dihydric phenols and derivatives thereof, polyhydric phenols and derivatives thereof, unmodified phenol novolak resins, modified phenol novolak resin, novolak resins, and mixtures thereof.

The cap ply rubber composition also comprises from 0.1 to 10 phr, from 0.1 to 8 phr, or alternatively from 0.1 to 5 phr of a methylene donor compound. Examples of suitable methylene donor compounds include, but are not limited to, hexamethoxymethylmelamine, hexamethylenetetramine, methoxymethyl melamine, N,N'N"-trimethyl N,N'N"-trimethylolmelamine, hexamethylomelamine, N,N'N"-dimethylolmelamine, N-methylolmelamine, N,N'-dimethylolmelamine, N,N'N"-tris(methoxymethyl)melamine, N,N'N"-tributyl-N,N'N"-trimethylol-melamine, hexaethoxymethylmelamine, and mixtures thereof.

The cap ply rubber composition preferably also contains a filler. The filler may be selected from the group consisting of carbon black, silica, and mixtures thereof. The total amount of filler may be from about 1 to about 200 phr, alternatively from about 5 to about 100 phr, from about 10 phr to about 30 phr, from about 30 phr to about 80 phr, or from about 40 to about 70 phr.

Carbon black, when present, may be used in an amount of about 1 to about 200 phr, in an amount of about 5 to about 100 phr, or alternatively in an amount of about 30 to about 80 phr. Suitable carbon blacks include commonly available, commercially-produced carbon blacks, but those having a surface area of at least 20 $m^2/g$, or preferably, at least 35 $m^2/g$ up to 200 $m^2/g$ or higher are preferred. Among useful carbon blacks are furnace blacks, channel blacks, and lamp blacks. A mixture of two or more carbon blacks can be used. Exemplary carbon blacks include, but are not limited to, N-110, N-220, N-339, N-330, N-352, N-550, N-660, as designated by ASTM D-1765-82a.

Examples of reinforcing silica fillers which can be used include wet silica (hydrated silicic acid), dry silica (anhydrous silicic acid), calcium silicate, and the like. Among these, precipitated amorphous wet-process, hydrated silicas are preferred. Silica can be employed in an amount of about 1 to about 100 phr, in an amount of about 5 to about 80 phr, or alternatively in an amount of about 30 to about 80 phr. The useful upper range is limited by the high viscosity imparted by fillers of this type. Some of the commercially available silicas which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0), and J. M. Huber Corporation.

The surface of the carbon black and/or silica may optionally be treated or modified to improve the affinity to particular types of polymers. Such surface treatments and modifications are well known to those skilled in the art.

If silica is used as a filler, it may be desirable to use a coupling agent to couple the silica to the polymer. Numerous coupling agents are known, including but not limited to organosulfide polysulfides and organoalkoxymercaptosilanes. Any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl)trisulfide, 3,3'-bis(methylbutylethoxysilylpropyl)tetrasulfide, 3,3'-bis(di t-butylmethoxysilylpropyl)tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methyl ethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl) disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide and 3,3'-bis(dimethoxyphenylsilyl-2-methylpropyl)disulfide.

Suitable organoalkoxymercaptosilanes include, but are not limited to, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane. Such organoalkoxymercaptosilanes may be capped with a blocking group, i.e., the mercapto hydrogen atom is replaced with another group. A representative example of a capped organoalkoxymercaptosilane coupling agent is a liquid 3-octanoylthio-1-propyltriethoxysilane, commercially available as NXT™ Silane from Momentive Performance Materials Inc.

Mixtures of various organosilane polysulfide compounds and organoalkoxymercaptosilanes can be used.

The amount of coupling agent in the rubber composition is the amount needed to produce acceptable results, which is easily determined by one skilled in the art. The amount of coupling agent is typically based on the weight of the silica in the composition, and may be from about 0.1% to about 20% by weight of silica, from about 1% to about 15% by weight of silica, or alternatively from about 1% to about 10% by weight of silica.

Additional fillers may also be utilized, including but not limited to, mineral fillers, such as clay, talc, aluminum hydrate, aluminum hydroxide and mica. The foregoing additional fillers are optional and can be utilized in varying amounts from about 0.5 phr to about 40 phr.

The cap ply rubber composition may comprise zinc oxide in an amount of 0.1 to 10 phr, from 1 to 7 phr, or from 2 to 5 phr. Other ingredients that may be added to the cap ply rubber composition include, but are not limited to, oils, waxes, scorch inhibiting agents, tackifying resins, reinforcing resins, fatty acids such as stearic acid, and peptizers. These ingredients are known in the art, and may be added in appropriate amounts based on the desired physical and mechanical properties of the rubber composition.

Vulcanizing agents and vulcanization accelerators may also be added to the cap ply rubber composition. Suitable vulcanizing agents and vulcanization accelerators are known in the art, and may be added in appropriate amounts based on the desired physical, mechanical, and cure rate properties of the rubber composition. Examples of vulcanizing agents include sulfur and sulfur donating compounds. The amount of the vulcanizing agent used in the rubber composition may, in certain embodiments, be from about 0.1 to about 10 phr, or from about 1 to about 5 parts by weight per 100 phr.

When utilized, the particular vulcanization accelerator is not particularly limited. Numerous accelerators are known in the art and include, but are not limited to, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), 2-(morpholinothio)benzothiazole (MBS), N-tert-butyl-2-benzothiazole sulfonamide (TBBS), N-cyclohexyl-2-benzothiazole sulfonamide (CBS), and mixtures thereof. The amount of vulcanization accelerator(s) used in the rubber composition may be from about 0.1 to about 10 phr or from about 1 to about 5 phr.

In one embodiment, the cap ply rubber composition may exclude any polymaleimide.

The rubber composition may be formed by mixing the ingredients together by methods known in the art, such as, for example, by kneading the ingredients together in a Banbury mixer. For example, the cap ply rubber composition may be mixed in at least two mixing stages. The first stage may be a mixing stage where no vulcanizing agents or vulcanization accelerators are added, commonly referred to by those skilled in the art as a non-productive mixing stage. In certain embodiments, more than one non-productive mixing stage may be used. The final stage may be a mixing stage where the vulcanizing agents and vulcanization accelerators are added, commonly referred to by those skilled in the art as a productive mixing stage. The non-productive mixing stage(s) may be conducted at a temperature of about 130° C. to about 200° C. The productive mixing stage may be conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

It has been discovered that it can be beneficial to add a portion of the zinc oxide in a non-productive mixing stage, and add the remaining portion of the zinc oxide in a productive mixing stage. For example, the ratio of the amount of zinc oxide added in a productive mixing stage to the amount of zinc oxide added in a non-productive mixing stage may be from 1:1 to 10:1, from 1:1 to 5:1, or from 2:1 to 3:1. Splitting the zinc oxide addition when mixing the rubber composition has been found to unexpectedly improve tensile properties and dynamic modulus. Specifically, splitting the zinc oxide addition may give a higher tensile strength at break, a higher elongation at break, as well as a higher dynamic modulus—all of which may be beneficial, especially for a cap ply rubber composition.

In one embodiment, the methylene acceptor resin is added in a different mixing stage than the methylene donor. For instance, the methylene acceptor resin can be added in a non-productive mixing stage, and the methylene donor can be added in the productive mixing stage.

In one embodiment, the cap ply rubber composition has a tangent delta value, measured at 60° C., a 1% strain amplitude, and a frequency of 52 Hz, of at least 0.01 lower than a comparative cap ply rubber composition lacking any hydrazide compound. By "comparative cap ply rubber composition lacking any hydrazide compound," it is meant that such comparative composition is the same except for the fact that it does not contain any hydrazide compound, and the comparative composition is prepared by the same or similar method used to prepare the hydrazide-containing rubber composition. In one embodiment, the tangent delta value may be lower than a comparative cap ply rubber composition lacking any hydrazide compound when the addition of zinc oxide, if used, is split between a productive and non-productive mixing stage. A lower tangent delta is desirable in a cap ply rubber composition, as such a result is indicative of lower hysteresis, which means less heat buildup when the tire is in operation, as well as lower rolling resistance.

The rubber composition formed according to the disclosure herein is particularly useful as a cap ply rubber composition. However, in certain embodiments, it may be used as another tire component, such as a tread, sidewall, bead filler, undertread, or a coating for a carcass ply. Additionally, other rubber articles may be formed from the rubber composition of the disclosure, such as an air spring component.

A cap ply of a tire comprises cords, often comprised of nylon, polyester, aramid, polyamine, or rayon. The type of cords used in the cap ply may be any material currently known to be suitable for use in a cap ply, as well as materials that may be found suitable in the future. It is well known that the cords of a cap ply are typically coated with an aqueous resorcinol-formaldehyde-latex ("RFL") dip to improve adhesion to the cap ply rubber composition. Such RFL dip formulations are well known to those skilled in the art. For example, a conventional RFL dip formulation can be made by making a resin solution comprising 11 parts of resorcinol, 178 parts of water, 0.9 parts of sodium hydroxide (50%), and 16.2 parts of formaldehyde (37%). The resin solution may then be added to 244 parts of vinyl pyridine latex (41%), 72.2 parts of water, and 12 parts of ammonium hydrixdie (28%). Details on the exemplary conventional RFL dip may be found, for example, in Durairaj, Raj B., "Resorcinol: chemistry, technology, and applications," 284, (2005), which is incorporated herein by reference.

The present disclosure will be described in more detail with reference to the following examples. The following examples are presented for purposes of illustration only and are not to be construed in a limiting sense.

EXAMPLES

Various rubber compositions were prepared according to the formulations shown in Table 1. All amounts shown are in phr.

TABLE 1

| Stage | | Control 1 | Control 2 | Control 3 | Experimental 1 | Experimental 2 |
|---|---|---|---|---|---|---|
| Non-productive Mixing Stage | SBR (1500 grade) | 30 | 30 | 30 | 30 | 30 |
| | Natural Rubber | 70 | 70 | 70 | 70 | 70 |
| | Carbon Black | 40 | 40 | 40 | 40 | 40 |
| | Napthenic Oil | 2 | 2 | 2 | 2 | 2 |
| | Zinc Oxide | 0 | 0 | 0 | 0 | 1 |
| | Phenolic resin[1] | 1 | 1 | 1 | 1 | 1 |
| | Resorcinol Resin[2] | 0 | 0 | 0.45 | 0.45 | 0.45 |
| | N'-(1,3-Dimethylbutylidene)-3-hydroxy-2-naphthohydrazide | 0 | 0.5 | 0 | 0.5 | 0.5 |
| | Stearic Acid | 1.2 | 1.2 | 1.2 | 1.2 | 1.2 |
| | Polymerized 2,2,4-Trimethyl-1,2-dihydroquinoline | 1 | 1 | 1 | 1 | 1 |
| Productive Mixing Stage | Zinc Oxide | 3.5 | 3.5 | 3.5 | 3.5 | 2.5 |
| | Hexamethoxymethylmelamine | 0 | 0 | 0.65 | 0.65 | 0.65 |
| | Sulfur (80% sulfur/20% oil) | 2.75 | 2.75 | 2.75 | 2.75 | 2.75 |
| | N-tert-Butyl-2-benzothiazolesulfenamide | 0.55 | 0.55 | 0.55 | 0.55 | 0.55 |
| | 2,2'-Dithiobis(benzothiazole) | 0.6 | 0.6 | 0.6 | 0.6 | 0.6 |

[1]HRJ-4166 from SI Group Inc.
[2]Penacolite B19-S from Indspec Chemical Corporation The hydrazide compound utilized in the examples was N'-(1,3-Dimethylbutylidene)-3-hydroxy-2-naphthohydrazide, the methylene acceptor resin was resorcinol, and the methylene donor was hexamethoxymethylmelamine.

Control 1 lacked any methylene acceptor resin, methylene donor, and hydrazide compound. Control 2 contained a hydrazide compound, but lacked any methylene acceptor resin or methylene donor. Control 3 contained a methylene acceptor resin and a methylene donor, but lacked a hydrazide compound. Experimental 1 contained a methylene acceptor resin, a methylene donor, and a hydrazide compound. Experimental 2 is the same composition as Experimental 1, with the only difference being that in Experimental 2, a portion of the zinc oxide was added in both the non-productive and productive mixing stages. Experimental 1 and Experimental 2 are according to the instant disclosure.

The rubber compositions were subjected to various tests. Tensile mechanical properties were measured using the procedure described in ASTM-D 412 at 22° C. The tensile test specimens had dumbbell shapes with a thickness of 1.9 mm. A specific gauge length of 25.4 mm was used for the tensile test. The tensile specimens were cured for 40 minutes at 149° C. Dynamic viscoelastic properties, such as E', E", and tangent delta were measured at a temperature of 60° C., a strain amplitude of 1%, and a frequency of 52 Hz. The specimens used for dynamic viscoelastic testing were cured for 40 minutes at 149° C., and had the following dimensions: 40 mm long, 4.7 mm wide, and 2 mm thick.

TABLE 2

| | Control 1 | Control 2 | Control 3 | Experimental 1 | Experimental 2 |
|---|---|---|---|---|---|
| DUMBELL TENSILE (ASTM D412, C-Die, Cure 40 Min @ 149° C.) | | | | | |
| Modulus at 300% Strain (Mpa) | 11.3 | 10.9 | 11.2 | 11.5 | 10.7 |
| Tensile at Break (Mpa) | 21.6 | 21.4 | 21.5 | 18.1 | 20.0 |
| Strain at Break (%) | 475 | 482 | 480 | 418 | 471 |
| Tensile at Break X Strain at Break | 10276 | 10298 | 10296 | 7582 | 9414 |
| DYNAMIC VISCOELASTIC TESTING (Cure = 40 Min @ 149° C.) | | | | | |
| E' (Mpa) | 3.9 | 3.9 | 4.0 | 4.0 | 4.4 |
| E" (Mpa) | 0.30 | 0.25 | 0.31 | 0.27 | 0.32 |
| Tan δ | 0.077 | 0.063 | 0.078 | 0.067 | 0.073 |

As can be seen from Table 2, the Experimental 1 composition has a tangent delta value of at least 0.01 less than the Control 3 composition, which is a comparative composition lacking any hydrazide compound. Such an affect is desirable in a cap ply rubber composition, as a lower tangent delta is indicative of less heat buildup when the tire is in operation, as well as lower rolling resistance.

Also, when comparing the Experimental 2 composition to the Experimental 1 composition, it can be seen that splitting the zinc oxide addition between the non-productive and productive mixing stages unexpectedly improves tensile properties and dynamic modulus (E') of the resulting rubber composition. Specifically, splitting the zinc oxide addition may give a higher tensile strength at break, a higher elongation at break, as well as a higher dynamic modulus—all of which are beneficial for a cap ply rubber composition.

The description has been provided with exemplary embodiments. Modifications and alterations may occur to others upon reading and understanding the preceding detailed description. It is intended that the disclosure and exemplary embodiments be construed as including all such modifications and alterations insofar as they come within the scope of the appended claims or the equivalents thereof.

We claim:

1. A tire cap ply comprising at least one textile cord layer coated with a skim rubber composition, the skim rubber composition comprising:
   (a) at least one natural or synthetic rubbery polymer;
   (b) from 0.1 to 20 phr of at least one hydrazide compound;
   (c) from 0.1 to 10 phr of at least one methylene donor;
   (d) from 0.1 to 10 phr of at least one methylene acceptor resin; and
   (e) from 0.1 to 10 phr of zinc oxide;
       wherein the at least one hydrazide compound is selected from a compound represented by Formula I or Formula II shown below:

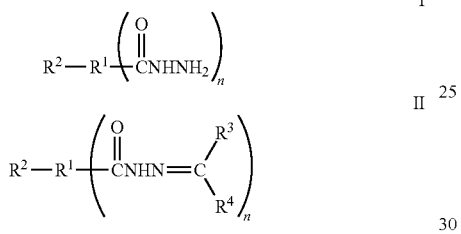

where:
   $R^1$ is selected from the group consisting of an acyclic aliphatic group having 2-18 carbons, a cyclic aliphatic group having 5-20 carbons, an aromatic group having 6-18 carbons, and an alkylaromatic group having 7-24 carbons,
   $R^2$ is selected from the group consisting of a hydroxy group, an amino group, and a mercapto group,
   each of $R^3$ and $R^4$ is the same or different and is selected from the group consisting of a hydrogen atom, an alkyl group having 1-18 carbons, a cyclohexyl group, and an aromatic group, and
   n is an integer selected from 2 or 3.

2. The tire cap ply of claim 1, wherein the skim rubber composition has a tan δ value, measured at 60° C., a 1% strain amplitude and a frequency of 52 Hz of at least 0.01 lower than a comparative composition lacking any hydrazide compound.

3. The tire cap ply of claim 1, wherein the rubbery polymer is selected from the group consisting of polyisoprene, polybutadiene, styrene-butadiene rubber, and combinations thereof.

4. The tire cap ply of claim 1, wherein the methylene donor is selected from the group consisting of hexamethoxymethylmelamine, hexamethylenetetramine, methoxymethyl melamine, N,N',N"-trimethyl N,N',N"-trimethylolmelamine, hexamethylolmelamine, N-methylolmelamine, N,N'-dimethylolmelamine, N,N',N"-tris(methoxymethyl)melamine, N,N',N"-tributyl-N,N',N"-trimethylol-melamine, hexaethoxymethylmelamine, and mixtures thereof.

5. The tire cap ply of claim 1, wherein the methylene acceptor resin is selected from the group consisting of resorcinol, resorcinolic derivatives, monohydric phenols and derivatives thereof, dihydric phenols and derivatives thereof, polyhydric phenols and derivatives thereof, unmodified phenol novolak resins, modified phenol novolak resin, novolak resins, and mixtures thereof.

6. The tire cap ply of claim 1, wherein the zinc oxide is present in a total amount ranging from 1 to 5 phr.

7. The tire cap ply of claim 1, wherein said skim rubber composition is void of a polymaleimide.

8. The tire cap ply of claim 1, wherein the at least one hydrazide compound is present in an amount of from 0.1 to 5 phr.

9. A method for reducing hysteresis in a tire by utilizing a cap tire ply comprising at least one textile cord layer coated with a skim rubber composition, where the skim rubber composition is made by a process comprising:
   mixing at least one natural or synthetic rubbery polymer with:
   (a) from 0.1 to 20 phr of at least one hydrazide compound;
   (b) from 0.1 to 10 phr of at least one methylene donor;
   (c) from 0.1 to 10 phr of at least one methylene acceptor resin; and
   (d) from 0.1 to 10 phr of zinc oxide;
   wherein a portion of the zinc oxide is mixed in a non-productive mixing stage and the remaining portion of zinc oxide is mixed in a productive mixing stage,
   wherein the at least one hydrazide compound is selected from a compound represented by Formula I or Formula II shown below:

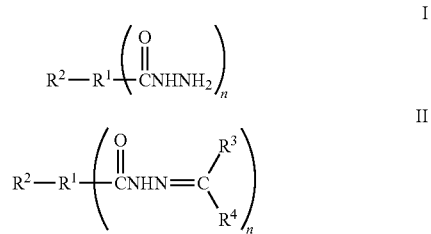

where:
   $R^1$ is selected from the group consisting of an acyclic aliphatic group having 2-18 carbons, a cyclic aliphatic group having 5-20 carbons, an aromatic group having 6-18 carbons, and an alkylaromatic group having 7-24 carbons,
   $R^2$ is selected from the group consisting of a hydroxy group, an amino group, and a mercapto group,
   each of $R^3$ and $R^4$ is the same or different and is selected from the group consisting of a hydrogen atom, an alkyl group having 1-18 carbons, a cyclohexyl group, and an aromatic group, and
   n is an integer selected from 2 or 3.

10. The method of claim 9, wherein the textile cord layer comprises fiber cords selected from nylon, polyester, aramid, polyamine, or rayon.

11. The method of claim 9, wherein the skim rubber composition has a tan δ value, measured at 60° C., a 1% strain amplitude and a frequency of 52 Hz of at least 0.01 lower than a comparative composition lacking any hydrazide compound.

12. The method of claim 9, wherein the rubbery polymer is selected from the group consisting of polyisoprene, polybutadiene, styrene-butadiene rubber, and combinations thereof.

13. The method of claim 9, wherein the methylene donor is selected from the group consisting of hexamethoxymethylmelamine, hexamethylenetetramine, methoxymethyl melamine, N,N',N"-trimethyl N,N',N"'-trimethylolmelamine, hexamethylolmelamine, N-methylolmelamine, N,N'-dimethylolmelamine, N,N',N"-tris(methoxymethyl)melamine, N,N',N"-tributyl-N,N',N"-trimethylol-melamine, hexaethoxymethylmelamine, and mixtures thereof.

14. The method of claim 9, wherein the methylene acceptor resin is selected from the group consisting of resorcinol and derivatives thereof, monohydric phenols and derivatives thereof, dihydric phenols and derivatives thereof, polyhydric phenols and derivatives thereof, unmodified phenol novolak resins, modified phenol novolak resin, novolak resins, and mixtures thereof.

15. A method for preparing a skim rubber composition for a textile-cord containing cap ply for a tire, where the skim rubber composition is made by a process comprising mixing:
(a) at least one natural or synthetic rubbery polymer;
(b) from 0.1 to 20 phr of at least one hydrazide compound;
(c) from 0.1 to 10 phr of at least one methylene donor;
(d) from 0.1 to 10 phr of at least one methylene acceptor resin; and
(e) from 0.1 to 10 phr of zinc oxide;
wherein a portion of the zinc oxide is mixed in a non-productive mixing stage and the remaining portion of zinc oxide is mixed in a productive mixing stage,
wherein the at least one hydrazide compound is selected from a compound represented by Formula I or Formula II shown below:

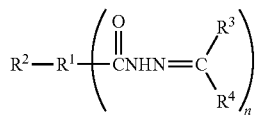

where:
R$^1$ is selected from the group consisting of an acyclic aliphatic group having 2-18 carbons, a cyclic aliphatic group having 5-20 carbons, an aromatic group having 6-18 carbons, and an alkylaromatic group having 7-24 carbons,
R$^2$ is selected from the group consisting of a hydroxy group, an amino group, and a mercapto group,
each of R$^3$ and R$^4$ is the same or different and is selected from the group consisting of a hydrogen atom, an alkyl group having 1-18 carbons, a cyclohexyl group, and an aromatic group, and
n is an integer selected from 2 or 3.

16. The method of claim 15, wherein the at least one hydrazide compound is present in an amount of from 0.1 to 5 phr.

17. The method of claim 15, wherein the at least one hydrazide compound is present in an amount of from 0.1 to 5 phr, the at least one methylene donor is present in an amount of from 0.1 to 5 phr, and the at least one methylene acceptor resin is present in an amount of from 0.1 to 5 phr.

18. The method of claim 15, wherein the ratio of the amount of zinc oxide added in a productive mixing stage to the amount of zinc oxide added in a non-productive mixing stage is from 1:1 to 10:1.

19. The tire cap ply of claim 1, wherein the textile cords comprise fiber cords selected from nylon, polyester, aramid, polyamine, or rayon.

* * * * *